UNITED STATES PATENT OFFICE.

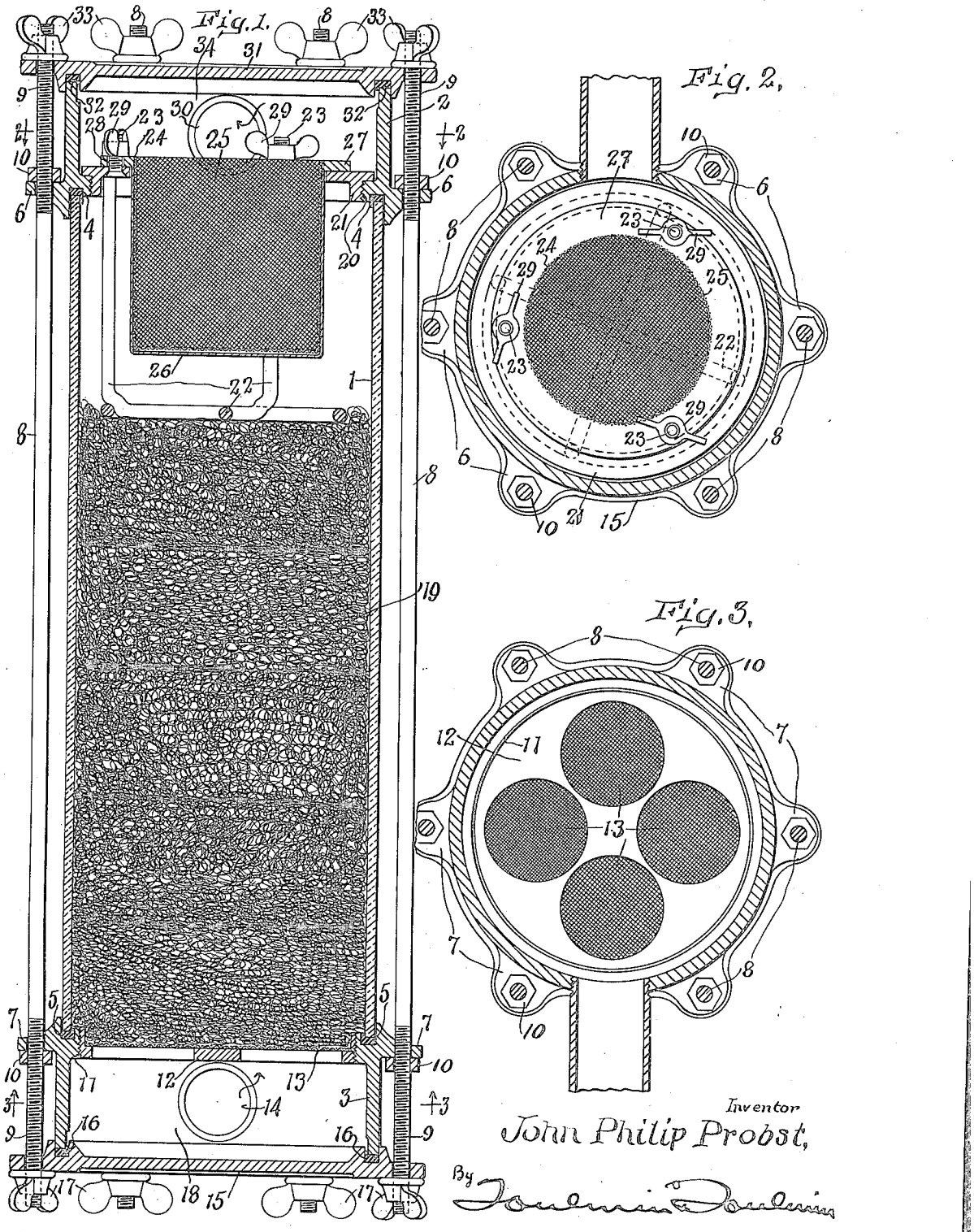

JOHN PHILIP PROBST, OF MARION, OHIO.

FILTER.

1,247,875.

Specification of Letters Patent.   Patented Nov. 27, 1917.

Application filed September 11, 1916.   Serial No. 119,336.

*To all whom it may concern:*

Be it known that I, JOHN PHILIP PROBST, a citizen of the United States, residing at Marion, in the county of Marion and State of Ohio, have invented certain new and useful Improvements in Filters, of which the following is a specification, reference being had therein to the accompanying drawing.

My invention relates to filters.

The object of my invention is to remove particles of matter from liquids. These particles make the liquids unsuitable or disagreeable for use either commercially or in domestic establishments.

In particular the object of my invention is to provide an apparatus which will remove objectionable and unsightly foreign matter from water used in buildings and dwellings. Frequently, the foreign matter appears in the shape of very minute particles barely visible to the naked eye when viewed individually, but forming a homogeneous black silt when viewed in the aggregate. This silt adheres to every object it touches primarily white enamels of plumbing fixtures and in the pipes of the plumbing. I have found that the silt appears mainly in rain water caught on roofs of dwellings and retained in cisterns. In practice I have found it particularly advantageous to locate my filter just at the exit of the water from the cistern as it is supplied to the dwelling, thus removing the foreign matter at the outset.

In the accompanying drawing, Figure 1 is a vertical sectional view through a filter embodying one form of my invention; Fig. 2 is a cross section of the same on the line 2—2 of Fig. 1, looking in the direction of the arrows; and Fig. 3 is a similar cross section on the line 3—3 of Fig. 1, looking in the direction of the arrows.

In the embodiment here illustrated I have provided a cylindrical tubular body portion 1 which may be made of glass, metal or any other suitable material. At the opposite ends of the tubular portion are located annular metallic rings 2 and 3. These rings are provided with suitable ledges and gaskets 4 and 5, whereby water tight joints are insured between the same and the body portion. Each of the rings 2 and 3 are provided at their inner portions with a circumferential series of apertured lugs 6 and 7. Longitudinally extending rods 8 connect adjacent lugs whereby the rings are securely clamped to the central tubular portion. For this purpose the ends 9 of each of the rods 8 are screw-threaded and extend beyond the lugs 6 and 7 for the purpose hereinafter described. Nuts 10 are provided which securely clamp the members 2 and 3 to the tubular portion. The upper portion of the lower member 3 is provided with a screw-threaded opening 11 in which is removably mounted a skeleton frame work 12 provided upon its upper side with a suitable screen 13. Below this screen and located in the member 3 is an inlet 14 through which fluid passes to the filter. The lower end of the member 3 is closed by means of a plate 15 which engages the member and forms a water tight joint, as indicated at 16. This plate is securely clamped to the member by means of butterfly nuts 17 which are mounted upon the screw-threaded ends of the rods 8, the rods passing through suitable apertures in the plate. The skeleton partition 12, the member 3 and the plate 15 form a suitable chamber 18 into which the fluid passes before it enters the filter proper.

Above the screen 13 and within the tubular body portion 1 is located the filtering material 19. This filtering material may consist of sponges closely packed within the filter and filling the entire lower portion thereof. It has been found that sponges are especially adapted for removing the silt and other impurities from the liquid. It is to be understood, however, that filtering materials which may be considered the equivalent of sponges or which possess the necessary qualities to perform the work intended may be used. I do not intend to limit myself to any particular form of filtering material.

In the present embodiment of the invention it is contemplated to allow the fluid or liquid to enter the filter at the bottom, to pass upwardly through the filtering material and out at the top. To further increase the filtering properties of my device and to prevent clogging the lower portion of the upper member 2 is provided with a screw-threaded opening 20 at its lower end and within this opening is located an annular ledge 21 provided with a downwardly extending wire cage 22 which serves to keep the sponges or other filtering material spaced from the upper portion of the tube 1. The member 21 is also provided with a series of upwardly extending threaded pins 23 and a central opening 24. Suitably supported within this opening is a cup-shaped filtering device 25 of wire gauze. Surrounding this gauze upon the outside thereof and supported thereby is an inclosing portion, 26, of cloth, such as canvas or linen. Any other suitable material, however, which will perform the functions may be used. The cup-shaped member 25 is provided with a suitable ledge 27 resting upon the member 21 and this ledge has openings 28 through which the screw-threaded pins 23 project and the parts are securely clamped together by means of butter fly nuts 29 upon these pins. The member 2 is provided with a suitable outlet 30 above the filtering device 25 and the end is inclosed by means of a plate 31 having a water tight joint 32. The plate 31 is likewise provided with openings through which the screw-threaded ends 9 of the rods 8 project and the plate is securely clamped in position by means of the butter fly nuts 33. The plate 31 and member 2 provides a chamber 34 at the upper end of the filter whereby the liquid may have an unobstructed passage out of the filter.

My construction provides a very efficient filter which will work continuously without clogging and which can be easily cleaned. The chamber 18 at the lower end of the casing provides an unobstructed space and prevents the filtering material from clogging up the inlet. It will be seen by providing the partition 13 above this inlet that the entire cross section of the filtering material or sponges are available for filtering purposes and at the same time the filtering material will not clog up the inlet. As the fluid passes upwardly the current will not dislodge the filtering material and cause it to adhere to the filtering cloth 26 for the reason that the cage 22 keeps it spaced therefrom and holds it in position. Any remaining silt which is not taken up by the sponges will adhere to the cloth 26, the gauze 25 serving to hold this cloth in position and preventing the collapse thereof under the water pressure. At the same time by providing a cup-shaped gauze a filtering area of greater extent is obtained than if the filtering device was in the nature of a straight partition, such as shown at 13. After passing through the filtering portions 25 and 26 the liquid will find an easy exit through the outlet 30.

This filter is so constructed that it can be placed on a suction line, discharge line, or water service line without resistance in pressure; also can be used on a gravity flow line or can be attached to the spout of a well pump or any source of water supply.

The gauze basket with covered cloth or linen as a final filter also prevents any parts of sponges or filtering material from passing out of the filter and causing obstruction in the water lines or causing leaks at faucets or valves.

Whenever it is desired to clean out the device or remove the filtering material and replace it by new material all that is necessary is to remove the clamping plate 31 and the member 25. It will be seen that the parts can be very easily and quickly taken apart.

While I have shown and described one embodiment of my invention it will be understood that this has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a filter, a body portion closed at each end, a porous partition spaced inwardly from one end thereof, an inlet communicating with said filter between said partition and the closed end thereof, filtering material in said body portion on the opposite side of said partition, a cage to prevent movement of said filtering material in the direction of flow of fluid, a cup-shaped porous support located within said cage and spaced from the opposite end of said body portion, a suitable filtering cover for said porous support, and an outlet located between said cup-shaped support and the closed end of the filter adjacent thereto.

2. A body portion, a detachable head on each end of said body portion, a packing between the head and the body portion, means to hold said heads to said body portion, a chamber at one end of said body portion, a perforated plate screw-threaded into the wall of said body portion to form with said head the chamber at one end of the filter, an inlet opening in said chamber, a gauze partition adjacent said perforated partition, filtering material supported by said gauze and perforated partitions, a second partition screw-threaded into the body portion on the other side of the filtering material, a gauze cup carried by said second partition, a second filtering material adjacent said gauze partition, means connected with said second partition to prevent the first-mentioned porous material from coming in contact with the second-mentioned porous material, a second chamber at the other end of said body portion, one wall of which is the second screw-threaded partition and the other wall of which is the other end of the body portion, and an outlet opening communicating with said chamber.

3. In a filter, a body portion, an end for said body portion, resilient packing interposed between said end and said body portion, a second end and resilient packing interposed between said second end and the body portion, means extending from one end to the other exterior of said body portion and clamping said ends to said body portion, a chamber at one end of said body portion, a perforated plate screw-threaded into the wall of said body portion to form with said head the chamber at one end of the filter, an inlet opening in said chamber, a gauze partition adjacent said perforated partition, filtering material supported by said gauze and perforated partitions, a second partition screw-threaded into the body portion on the other side of the filtering material, a gauze cup carried by said second partition, a second filtering material adjacent said gauze partition, means connected with said second partition to prevent the first-mentioned porous material from coming in contact with the second-mentioned porous material, a second chamber at the other end of said body portion, one wall of which is the second screw-threaded partition and the other wall of which is the other end of the body portion, and an outlet opening communicating with said chamber.

4. A body portion, a collar at each end of said body portion, packing between said collars and the respective ends of said body portion, a removable head adjacent the edge of the collar opposite to the edge of the collar adjacent to the body portion at one end of said body portion, a similar head adjacent the other collar at the other end of said body portion, a plurality of adjustable means for clamping said heads to said collars extending from one head to the other, clamping means for clamping said collars to said body portion, an internal screw-threaded perforated partition threaded into one end of one collar, a gauze partition superimposed upon said perforated partition, a chamber formed by the perforated partition and gauze partition acting as one wall and the head acting as the other wall, an inlet opening communicating with said chamber, porous fibrous filtering material superimposed on said gauze and perforated partition, a second internal screw-threaded partition threaded into the second collar and located at the other end of said filtering material, a depending cup-shaped gauze partition attached to said last-mentioned partition, a guard suspended from said partition to prevent said porous material from coming in contact with said depending cup-shaped porous partition, a second chamber formed by the second partition and the head at the other end of the filter, and an exit opening communicating with said head, whereby fluid entering at the inlet opening will collect in the chamber at one end of the body portion, proceed through the porous partition and filtering material, the second porous partition and second chamber and thence out of the exit opening.

In testimony whereof, I affix my signature.

JOHN PHILIP PROBST.